US005821496A

United States Patent [19]

Mizufune et al.

[11] Patent Number: 5,821,496

[45] Date of Patent: Oct. 13, 1998

[54] METHOD OF CONTROLLING TRANSIENT RECOVERY VOLTAGE AND GAS INSULATION SWITCH GEAR USING THE SAME

[75] Inventors: Eisaku Mizufune; Takashi Sato, both of Hitachi; Katsuichi Kashimura, Takahagi; Osamu Koyanagi, Hitachi; Yoshihito Asai, Hitachi; Yukio Korosawa, Hitachi, all of Japan

[73] Assignee: Hitachi, Ltd., Tokyo, Japan

[21] Appl. No.: 529,398

[22] Filed: Sep. 18, 1995

[30] Foreign Application Priority Data

Sep. 20, 1994 [JP] Japan .................................... 6-224738

[51] Int. Cl.[6] ............................ H01H 33/16; H02H 3/00

[52] U.S. Cl. ............................................ 218/145; 361/113

[58] Field of Search .............................. 218/1, 8, 13, 43, 218/143–145; 361/58, 113, 9, 65, 91, 102, 107, 111; 307/401; 331/36 R

[56] References Cited

U.S. PATENT DOCUMENTS 3,522,472 8/1970 Breitholtz ................................ 315/126
3,611,031 10/1971 Lutz ...................................... 317/11 C
3,946,300 3/1976 Landis ..................................... 321/8 C
3,957,329 5/1976 McConnell ................................ 316/16

FOREIGN PATENT DOCUMENTS 3-190021 8/1991 Japan ............................ H01H 33/64

*Primary Examiner*—Michael A. Friedhofer
*Attorney, Agent, or Firm*—Fay,Sharpe,Beall,Fagan,Minnich & McKee

[57] ABSTRACT

The steep initial rate of rise of the transient recovery voltage across the poles of a circuit breaker just after a fault current break is decreased. The breaking performance in the case of a short-circuit fault to ground taking place in an electrical power transmission system at relatively as near a place as several kilometers apart from the circuit breaker, that is a short-line-fault is improved by a saturable reactor having a capacitor connected in parallel therewith to the circuit breaker in series. As a result, as the saturable reactor changes from the magnetically saturated state to the unsaturated state just before the zero point of the fault current, the self-inductance of the saturable reactor gradually increases and an LC resonance is produced between the self-inductance of the saturable reactor and the capacitor connected to the saturable reactor in parallel. Therefore, the peak value and the time period of the current flowing from the saturable reactor can be controlled to control the initial rate of rise of the transient recovery voltage.

18 Claims, 6 Drawing Sheets

METHOD OF CONTROLLING TRANSIENT RECOVERY VOLTAGE AND GAS INSULATION SWITCH GEAR USING THE SAME

BACKGROUND OF THE INVENTION

The present invention relates to a method of controlling transient recovery voltage at a short-line-fault break of a power switch gear, particularly a gas circuit breaker, provided for protecting an electric power system such as a power substation, a power switching station and so on, and a method of controlling transient recovery voltage of a direct current circuit breaker.

The recent increase in electric power demand has brought the promotion of higher voltage and larger transmission capacity in power transmission systems by employing UHV power transmission or the like. On the other hand, the fault current at the occurrence of an earth fault in a transmission system is gradually increasing due to the increase in its transmission capacity, and it is inevitable to make circuit breakers smaller in size since it is required by the conditions of a site for a power substation or a power switching station nowadays. Therefore, efforts have been concentrated on the improvement of the breaking performance by decreasing the number of breaking points and at the same time increasing the breaking capacity per point.

Under conditions, the increase in transmission capacity leads to an increase in the earth fault current at a short-circuit fault between a transmission line and the earth at a position several kilometers apart from a circuit breaker, that is, at a short-line-fault break. Therefore, the breaking duty becomes more severe in view of the increasing rate of the triangular-wave shaped transient recovery voltage appearing across the poles of a circuit breaker at a break.

Technology is disclosed in, for example, Japanese Patent Application Laid-Open No.3-190021 (1991) that is directed to responding to this problem.

This technology is shown in FIG. 9, which shows a conventional transmission system of a construction where a power source composed of a generator 5, a power source reactor 6 and an earth electrostatic capacitor 7 and a transmission line 4 are connected to a circuit breaker 1 with which a saturable reactor 2 is connected in series. An earth fault current 8 at the time of a short-line-fault flows through the circuit breaker 1 and the saturable reactor 2 connected to the circuit breaker in series. At that time, as to the time variations of the earth fault current 8 and the transient recovery voltages 15, 16 are as shown in FIG. 10. The B-H loop of the saturable reactor 2 makes a magnetic saturation state to an unsaturated state transition at a point P just before the zero point in as the earth fault current 8 attenuates toward the zero level. Thereby, the self-inductance of the saturable reactor 2 gradually increases. As the result, as shown in FIG. 10, the time-varying rate dI/dt of the earth fault current I is moderated after the point P.

Therefore, the increasing rate dV/dt of the transient recovery voltage appearing between the poles of a circuit breaker can be expressed by the following equation.

$$[dV/dt]=Z\cdot[dI/dt] \quad \text{(Equation 1)}$$

Z: surge impedance in the transmission line side seen from the circuit breaker across its poles The increasing rate $(dV/dt)_{CB}$ of recovery voltage which can be broken by a circuit breaker has a characteristic expressed by the following equation.

$$[dV/dt]_{CB}=k\cdot[dI/dt]^{-m} \quad \text{(Equation 2)}$$

k: proportional constant m: positive constant

Therefore, the increasing rate of the transient recovery voltage generated across the poles of the circuit breaker 1 is, as shown in FIG. 10, changed from the transient recovery voltage 15 having a steep increasing rate when there is no saturable reactor 2 to the transient recovery voltage 16 having a moderated increasing rate when there is the saturable reactor 2.

Further, since the time-varying rate dI/dt of the earth fault current I is moderated, the breaking performance of the circuit breaker can be improved and it is possible to attain a highly reliable performance of the circuit breaker without thermal dielectric breakdown at the occurrence of a short-line-fault break.

As for the installing position, the saturable reactor 2 is arranged so as to surround an arc contractor of a fixed contractor composing a main conductor of the circuit breaker as disclosed in Japanese Patent Application Laid-Open No.3-190028 (1991).

As described above, in the conventional technology, the increasing rate of the transient recovery voltage across the poles of the circuit breaker can be decreased by moderating the time varying rate dI/dt of the earth fault current I at the point P just before the zero point of current, and the breaking performance can be improved by increasing the breakable increasing rate of the transient recovery voltage.

However, just after the zero current point of the earth fault current I, residual current having the reversed polarity to the earth fault current I just before the zero current point flows in the circuit beaker and the saturable reactor, and the peak value of the residual current is as small as several milliamperes and the time period is also short. Therefore, the terminal voltage of the saturable reactor is rapidly decreased after the zero current point.

As a result, since the terminal voltage is superposed with the transient recovery voltage on the side of the transmission line, there is a problem that the rate of rise of the transient recovery voltage across the poles of the circuit breaker just after the zero current point at the initial stage becomes larger than the increasing rate of the transient recovery voltage across the poles in the case without the saturable reactor by contraries.

SUMMARY OF THE INVENTION

An object of the present invention is to solve the above problem and to provide a circuit breaker of which the breaking performance is improved without increasing the size and the operating force of the breaker unit.

The object of the present invention can be attained by providing a construction where a saturable reactor having a capacitor connected in parallel is directly connected to a gas circuit breaker in series.

According to the present invention, the self-inductance L of the saturable reactor is gradually increased as the saturable reactor changes from a magnetically saturated state initially preset by the conducting current to an unsaturated state just before the earth fault current reaches the zero point. With this change, a voltage is generated across the terminals of the saturable reactor. Further, after the zero current point, there is a residual current having a polarity reverse to the polarity of the fault current just before the zero current point. The residual current is divided to flow between the saturable reactor and the capacitor connected in parallel. At that time, since an LC resonance is produced by the repeated charging and discharging between the self-inductance L of the saturable reactor and the parallel capacitor C, the peak value of the voltage across the terminals of the saturable reactor just after the zero current point becomes large compared with the case without the parallel capacitor connected to the saturable reactor, and current having a long period flows through the saturable reactor. Therefore, even after the zero current point, it is possible to increase the voltage across the terminals of the saturable reactor. The voltage across the terminals of the saturable reactor is superposed with the transient recovery voltage in the transmission line side. Since the transient recovery voltage across the terminals of the circuit breaker is given by the difference between the transient recovery voltage at the power source side and the transient recovery voltage at the transmission line side, the increasing rate of the transient recovery voltage across the breaker poles in the case of a short-line-fault can be decreased comparing to the case without the saturable reactor. Therefore, the circuit breaking can be easily performed and the breaking performance is improved without increasing the size and the operating force of the breaker unit.

DETAILED DESCRIPTION OF THE PREFERRED EMBODIMENTS

Figure 9:
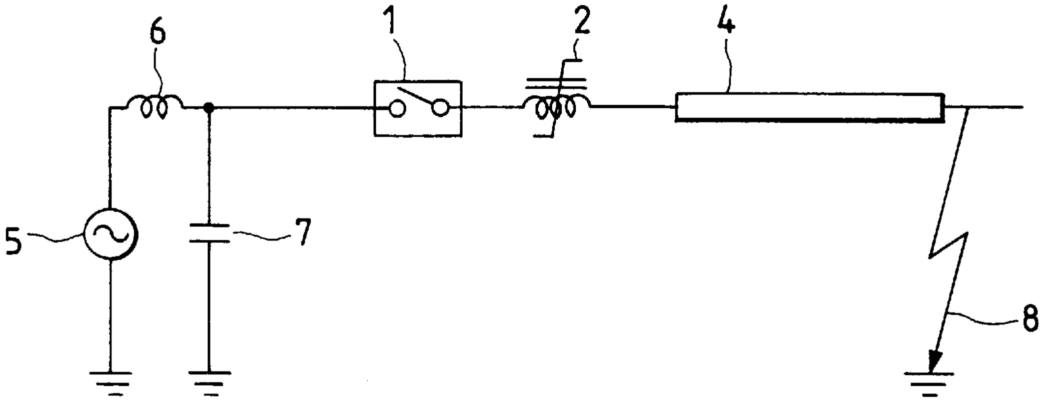
FIG. 9 PRIOR ART
FIG. 9 is a diagram of a power system configuration showing a conventional method of controlling transient recovery voltage.
Figure 10:
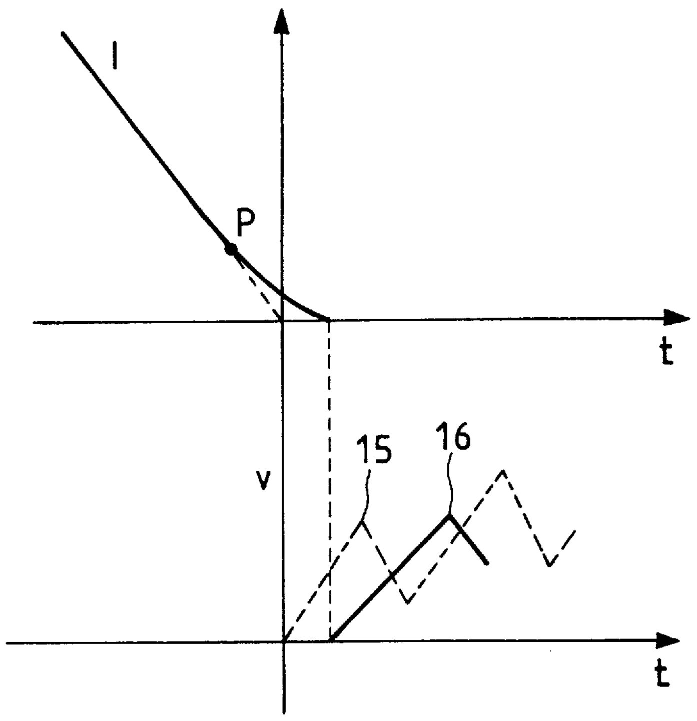
FIG. 10 PRIOR ART
FIG. 10 shows the time-varying characteristic of the breaking current and voltage at a fault for explaining the operation of a conventional method.

The present invention will be described below, referring to an embodiment shown in FIG. 1. The explanation of the parts shown in FIG. 1 that are the same as those described in FIG. 9 and identified by the same reference character, will be omitted.

Figure 1:
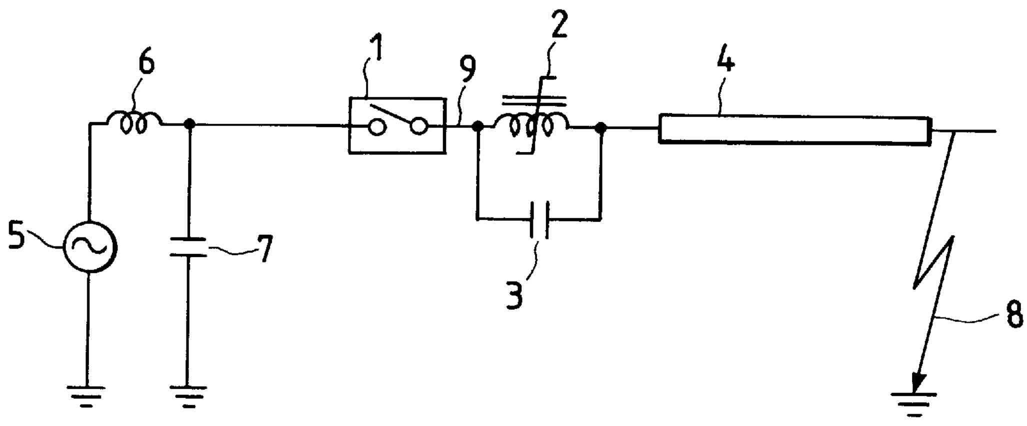
FIG. 1 is a diagram of a power system configuration showing an embodiment of a method of controlling transient recovery voltage in accordance with the present invention.

FIG. 1 is a diagram of a power system configuration showing an embodiment of a method of controlling transient recovery voltage in accordance with the present invention.

In a circuit breaker 1 for breaking electrical connection between the power source side and the transmission line side, a saturable reactor 2 having a capacitor 3 connected in parallel therewith and a transmission line 4 are arranged. The magnetic material composing the saturable reactor 2 has such a B-H loop characteristic that when the exciting magnetic field H decreases toward zero, the magnetic flux density B steeply decreases. As to the magnetic materials usable, there are, for example, amorphous soft magnetic materials such as ferrites, amorphous alloys or ultra-fine-grain crystal soft magnetic materials.

Figure 2:
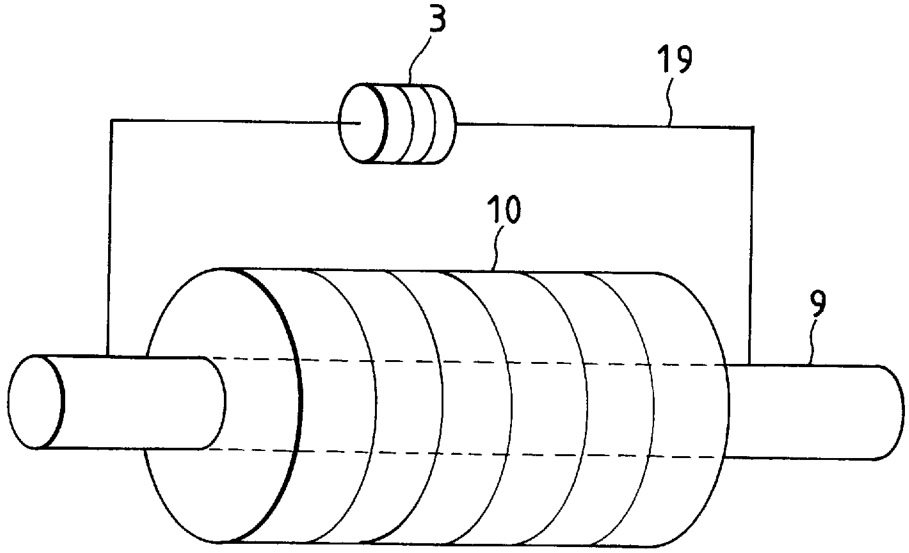
FIG. 2 is a perspective view showing the positional relationship of an embodiment of an arrangement of a saturable reactor and a parallel capacitor in accordance with the present invention.

In FIG. 2 which is a perspective view showing the positional relationship of an embodiment of an arrangement of a saturable reactor and a parallel capacitor in accordance with the present invention, the saturable reactor 2 is constructed by stacking toroidal-shaped magnetic core units 10 made of the magnetic material in a multi-stage operation, and a part of the main circuit conductor 9 of the circuit breaker is formed in a pipe-shaped conductor made of a non-magnetic metallic material, and the magnetic core units 10 are coaxially arranged on the pipe-shaped conductor.

Figure 3:
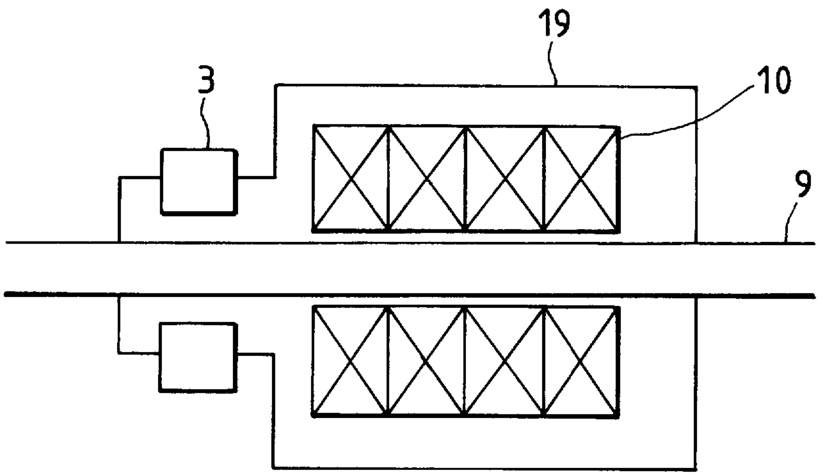
FIG. 3 is a perspective view showing the positional relationship of another embodiment of an arrangement of a saturable reactor and a parallel capacitor in accordance with the present invention.
Figure 4:
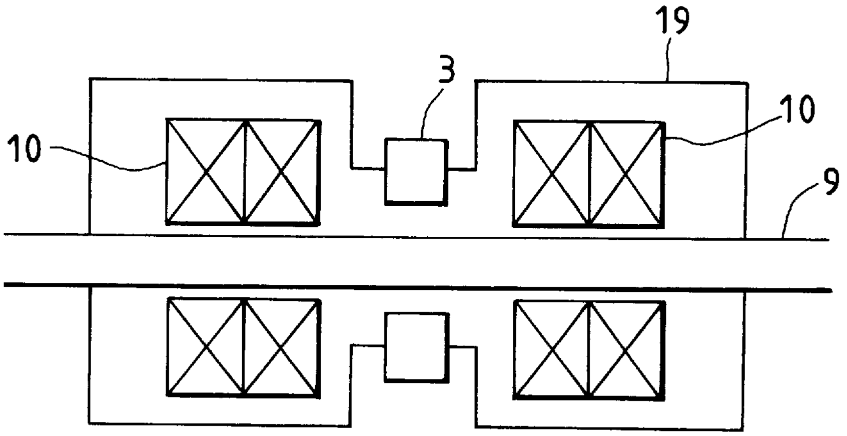
FIG. 4 is a perspective view showing the positional relationship of a further embodiment of an arrangement of a saturable reactor and a parallel capacitor in accordance with the present invention.

In order to prevent the magnetic characteristic of the magnetic core units 10 from varying by effectively radiating the heat generated by hysteresis loss and eddy current loss of the magnetic core units 10, a gap may be provided between the magnetic core units 10 using an insulator. Further, a ceramic capacitor may be employed as the parallel capacitor 3, and arranged in the outer periphery of the magnetic core units and electrically connected to the main circuit conductor 9 of the circuit breaker using a conductor 19 such as a lead wire or a metal plate. FIG. 3 shows the positional relationship of another embodiment of an arrangement of the saturable reactor 2 and the parallel capacitor 3 in accordance with the present invention. This embodiment is characterized by arranging the parallel capacitor 3 on a straight line extending from the saturable reactor 2 to suppress the space expanding toward the radial direction. FIG. 4 shows the positional relationship of a further embodiment of an arrangement of the saturable reactor 2 and the parallel capacitor 3 in accordance with the present invention. The saturable reactor 2, composed of a plurality of the magnetic core units 10, is divided into two, and the parallel capacitor 3 is arranged between the divided saturable reactors.

The operation of the embodiments will be described below, referring to FIG. 5.

Figure 5:
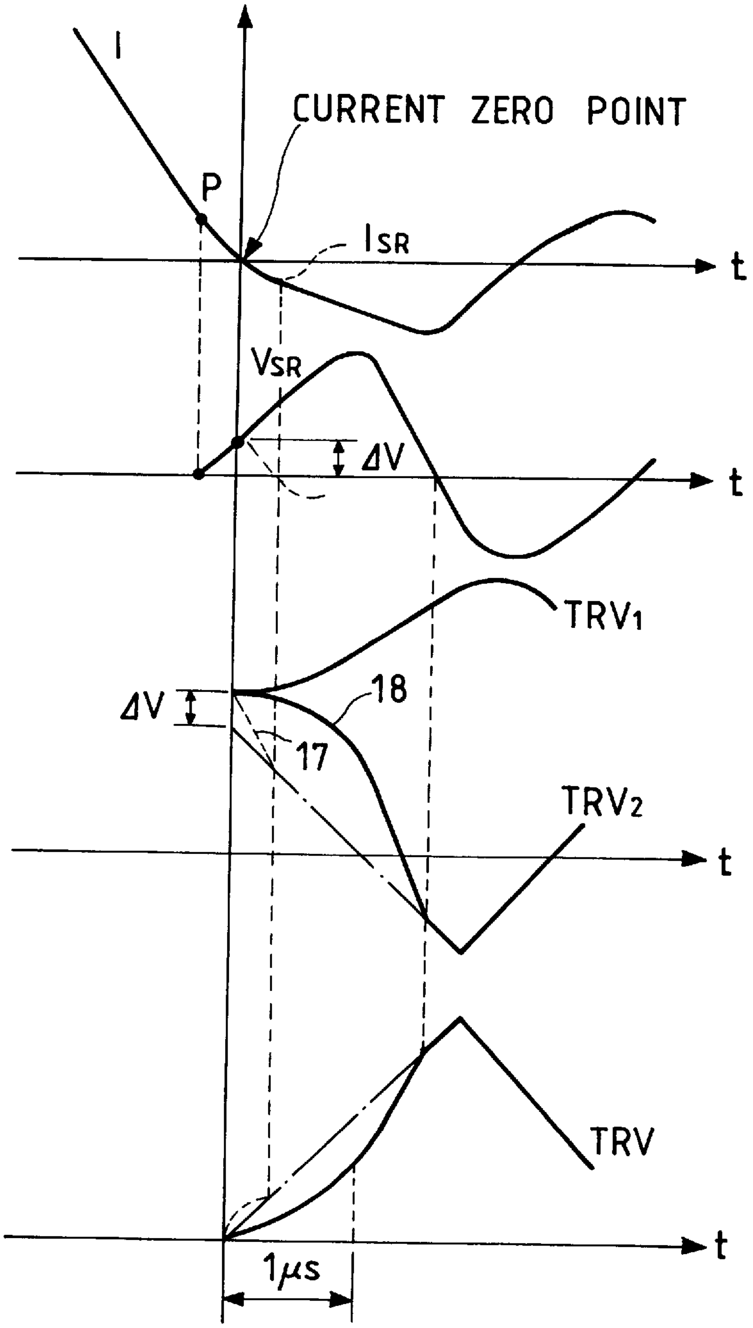
FIG. 5 is a time-varying characteristic of the breaking current and voltage at a fault for explaining the operation of the embodiment.

As shown in FIG. 5, in the process that the earth fault current I is attenuating toward the zero level and the saturable reactor 2 is changed from the magnetically saturated state initially preset by the conducting current to the unsaturated state, the magnetic saturation of the saturable reactor 2 is released at a point P just before the zero current point then, the self-inductance of the saturable reactor 2 is gradually increased. Corresponding to this, the voltage $V_L$ across the terminals of the saturable reactor 2 begins to increase at the time corresponding to the point P when the magnetic saturation is released, and reaches $V_{SR}=\Delta V$ at the zero current point. For the case where the saturable reactor 2 does not have the parallel capacitor 3, the residual current flowing just after the zero current point directly flows through the saturable reactor 2. Since the reactor current $I_{SR}$ (dotted line) is several amperes at peak and has a short period, the voltage $V_{SR}$ (dotted line) across the terminals of the saturable reactor 2 is steeply decreased from the voltage $V_{SR}=\Delta V$ at the zero current point. At that time, the initial rate of rise of the transient recovery voltage $TRV_2$ at the transmission line side (chain line) in the case without the saturable reactor 2 is superposed with the voltage across the terminals $V_{SR}$ 17 after the zero current point, and the initial increasing rate of the transient recovery voltage TRV across the poles of the circuit breaker is the difference between the transient recovery voltage $TRV_2$ at the transmission line side and the transient recovery voltage $TRV_1$ at the power source side superposed with the voltage ΔV. The initial increasing rate of the transient recovery voltage TRV across the poles of the circuit breaker becomes larger than the initial increasing rate of the transient recovery voltage (chain line) without the saturable reactor 2. Therefore, the breaking performance is decreased.

For the embodiments according to the present invention where the saturable reactor 2 has a parallel capacitor 3, the voltage $V_{SR}$ across the terminals of the saturable reactor 2 after the zero current point charges the parallel capacitor 3 and the charged capacitor discharges to the saturable reactor 2 to supply current to the saturable reactor 2, and then by repeating this process an LC resonance is produced between the self-inductance L of the saturable reactor 2 and the electrostatic capacitance C of the parallel capacitor 3. At that time, as shown in FIG. 5, the current $I_{SR}$ flowing to the saturable reactor 2 can be controlled so that the peak value and the time period become large by properly choosing the electrostatic capacitance C of the parallel capacitor 3. By doing so, the voltage $V_{SR}$ across the terminals of the saturable reactor 2 (solid line) is increased also after the zero current point, and the voltage across the terminals 18 described above is superposed to the transient recovery voltage $TRV_2$ at the transmission line side. As a result, the initial increasing rate of the transient recovery voltage TRV (solid line) across the poles of the circuit breaker becomes lower than the transient recovery voltage TRV across the poles (chain line) for the case without the saturable reactor 2. In the case of a short-line-fault, the increasing rate of the transient recovery voltage across the poles at the time t=1 μs after the zero current point determines the breaking performance. Therefore, the voltage $V_{SR}$ across the terminals of the saturable reactor 2 after the zero current point is kept higher than the voltage ΔV so that the decreased transient recovery voltage TRV across the poles (solid line) becomes lower than the transient recovery voltage TRV across the poles (chain line) for the case without the saturable reactor 2, at least for the time t=1 μs.

Figure 6:
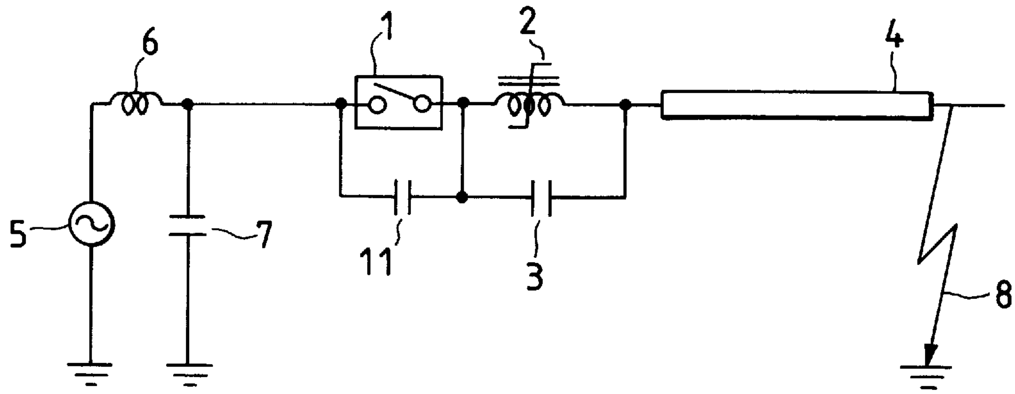
FIG. 6 is a diagram of a power system configuration showing another embodiment of a method of controlling transient recovery voltage in accordance with the present invention.

FIG. 6 is a diagram of a power system configuration showing another embodiment of a method of controlling transient recovery voltage in accordance with the present invention.

The saturable reactor 2 having the capacitor 3 connected in parallel is connected in series to a circuit breaking portion 1 having a capacitor 11 across the poles. In this case, by existence of the capacitor 11 across the poles, a part of the earth fault current 8 is divided to flow to the capacitor 11 across the poles and the peak value of the earth fault current flowing to the circuit breaking portion 1 is decreased. Since the time-varying rate dI/dt is, therefore, moderated, the increasing rate of the transient recovery voltage is further effectively decreased, and consequently the breaking performance can be improved even more.

Figure 7:
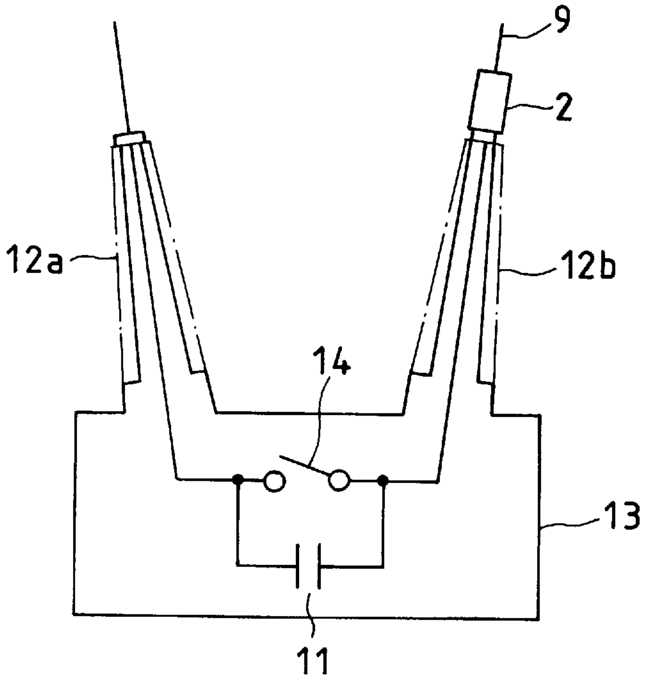
FIG. 7 is a view showing an arrangement of a saturable reactor in the embodiment of FIG. 6.
Figure 8:
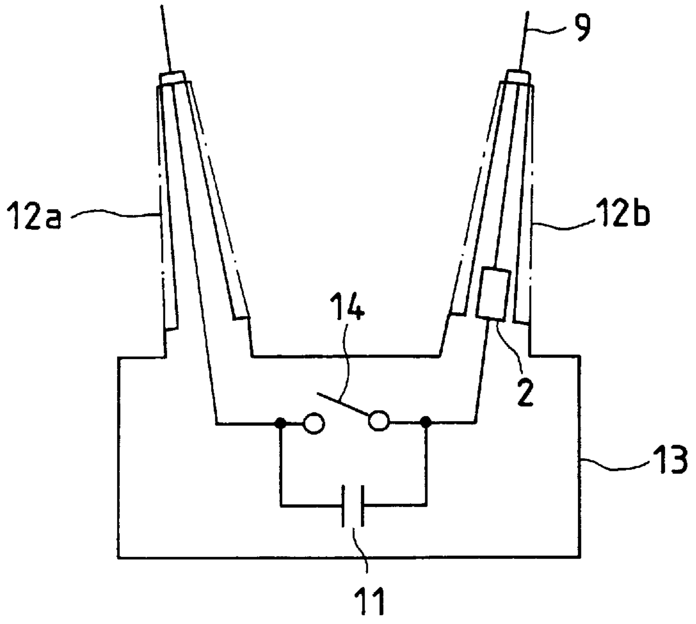
FIG. 8 is a view showing another arrangement of a saturable reactor in the embodiment of FIG. 6.

FIG. 7 and FIG. 8 are views showing the arrangement of the saturable reactor 2 in the embodiment of FIG. 6. As shown in FIG. 7, the circuit breaking portion 14 is connected to the transmission line, not shown, through the main circuit conductor 9 of bushings 12*a*, 12*b* provided in a circuit breaker tank 13, and the saturable reactor 2 is arranged in and fixed to the main circuit conductor 9 in the outer end of the bushing 12*b* at the transmission line side. In FIG. 8, the saturable reactor 2 is arranged in and fixed to the main circuit conductor 9 inside of the bushing 12*b*. Although in the embodiment the saturable reactor 2 is installed near the circuit breaker portion 14, the saturable reactor may be installed in a part of the main circuit conductor of the gas insulation switch gear and may be also installed at the transmission line side near the gas insulation switch gear.

As having been described above, according to the present invention, in the case of a short-line-fault in an electric power system, the steep increasing rate of the transient recovery voltage across the poles of a circuit breaker can be suppressed by connecting a saturable reactor having a capacitor connected in parallel therewith to a circuit breaker in series. As the result, the breaking capacity per breaking unit can be equivalently increased, and the cost can be decreased by decreasing the size and the operating force of the breaking portion.

What is claimed is:

1. A method of controlling transient recovery voltage, wherein a saturable reactor having a capacitor connected in parallel is connected to a gas circuit breaker in series, and wherein an LC resonance is produced between a self-inductance L of said saturable reactor and an electrostatic capacitance C of the parallel capacitor.

2. A method of controlling transient recovery voltage according to claim 1, further including said gas circuit breaker having a capacitor connected across poles of said gas circuit breaker.

3. A method of controlling transient recovery voltage according to claim 1, wherein said saturable reactor is made of either of an amorphous soft magnetic material and an ultra-fine-grain-crystal soft magnetic material.

4. A method of controlling transient recovery voltage according to claim 1, wherein said saturable reactor is of a toroidal shape and is arranged coaxially to a main circuit conductor of said gas circuit breaker.

5. A method of controlling transient recovery voltage according to claim 1, wherein said saturable reactor is arranged at one of an outer top conductor and an inner conductor of a bushing in a transmission line side of a main circuit conductor of said circuit breaker.

6. A method of controlling transient recovery voltage according to claim 1, wherein the saturable reactor having the capacitor connected in parallel is arranged in a part of a main circuit conductor of said gas circuit breaker.

7. A method of controlling transient recovery voltage according to claim 1, wherein the saturable reactor having the capacitor connected in parallel is arranged in a transmission line near said gas circuit breaker.

8. A method of controlling transient recovery voltage according to claim 1, wherein said saturable reactor is formed by stacking toroidal-shaped magnetic core units in multi-stage.

9. A method of controlling transient recovery voltage according to claim 1, wherein the capacitor is arranged in an outer periphery of said saturable reactor.

10. A method of controlling transient recovery voltage according to claim 1, wherein the saturable reactor comprises a magnetic core, and the magnetic core and the parallel connected capacitor are arranged in a straight line.

11. A method of controlling transient recovery voltage, wherein a saturable reactor having a capacitor connected in parallel is connected to a direct current gas circuit breaker in series.

12. A gas insulation switch gear, comprising a circuit composed of a capacitor and a saturable reactor connected to said capacitor in parallel and a gas circuit breaker connected in series, wherein an LC resonance is produced between a self-inductance L of said saturable reactor and an electrostatic capacitance C of the parallel capacitor.

13. A gas insulation switch gear according to claim 12, wherein said gas circuit breaker comprises a capacitor across poles.

14. A gas insulation switch gear according to claim 12, wherein said saturable reactor is of a toroidal shape and is arranged coaxially to a main circuit conductor of said gas circuit breaker.

15. A gas insulation switch gear according to claim 12, wherein said saturable reactor is arranged at an outer top conductor of a bushing in a transmission line side of a main circuit conductor of said circuit breaker.

16. A gas insulation switch gear according to claim 12, wherein the saturable reactor having the capacitor connected in parallel is arranged in a transmission line near said gas circuit breaker.

17. A gas insulation switch gear according to claim 12, wherein said saturable reactor is formed by stacking toroidal-shaped magnetic core units in multi-stage.

18. A gas insulation switch gear, wherein a circuit composed of a capacitor and a saturable reactor connected to said capacitor in parallel and a direct current gas circuit breaker are connected in series.

* * * * *